United States Patent
Cornwell et al.

(10) Patent No.: US 8,291,166 B2
(45) Date of Patent: Oct. 16, 2012

(54) CACHING PERFORMANCE OPTIMIZATION

(75) Inventors: Michael J. Cornwell, San Jose, CA (US); Christopher P. Dudte, San Jose, CA (US); Kenneth L. Herman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 344 days.

(21) Appl. No.: 12/786,115

(22) Filed: May 24, 2010

(65) Prior Publication Data

US 2010/0228909 A1 Sep. 9, 2010

Related U.S. Application Data

(63) Continuation of application No. 11/335,968, filed on Jan. 20, 2006, now Pat. No. 7,752,391.

(51) Int. Cl.
G06F 12/00 (2006.01)
G06F 13/00 (2006.01)
G06F 13/28 (2006.01)

(52) U.S. Cl. ............... 711/118; 711/103; 711/E12.001; 711/E12.008; 711/E12.041

(58) Field of Classification Search ............... 711/118, 711/103, E12.001, E12.008, E12.041
See application file for complete search history.

(56) References Cited

U.S. PATENT DOCUMENTS

| | | | |
|---|---|---|---|
| 4,258,310 A * | 3/1981 | Asakawa et al. | 323/281 |
| 4,654,821 A * | 3/1987 | Lapp | 713/330 |
| 5,473,765 A | 12/1995 | Gibbons et al. | |
| 5,602,987 A | 2/1997 | Harari et al. | |
| 5,671,229 A | 9/1997 | Harari et al. | |
| 5,719,808 A | 2/1998 | Harari et al. | |
| 5,754,567 A | 5/1998 | Norman | |
| 5,890,169 A | 3/1999 | Wong et al. | |
| 6,149,316 A | 11/2000 | Harari et al. | |
| 6,175,899 B1 * | 1/2001 | Baylor et al. | 711/144 |
| 6,253,300 B1 | 6/2001 | Lawrence et al. | |
| 6,256,232 B1 | 7/2001 | Chang et al. | |
| 6,269,420 B1 | 7/2001 | Horie | |
| 6,279,069 B1 | 8/2001 | Robinson et al. | |
| 6,282,706 B1 | 8/2001 | Chauvel et al. | |
| 6,339,793 B1 | 1/2002 | Bostian et al. | |
| 6,426,893 B1 | 7/2002 | Conley et al. | |
| 6,463,509 B1 * | 10/2002 | Teoman et al. | 711/137 |
| 6,721,820 B2 | 4/2004 | Zilberman et al. | |
| 6,757,842 B2 | 6/2004 | Harari et al. | |
| 6,763,424 B2 | 7/2004 | Conley | |
| 6,914,846 B2 | 7/2005 | Harari et al. | |
| 6,947,332 B2 | 9/2005 | Wallace et al. | |
| 6,973,447 B1 | 12/2005 | Aguilar et al. | |
| 7,137,011 B1 | 11/2006 | Harari et al. | |

(Continued)

*Primary Examiner* — Sheng-Jen Tsai
(74) *Attorney, Agent, or Firm* — Meyertons, Hood, Kivlin, Kowert & Goetzel, P.C.

(57) ABSTRACT

A method for managing data storage is described. The method includes receiving data from an external host at a peripheral storage device, detecting a file system type of the external host, and adapting a caching policy for transmitting the data to a memory accessible by the storage device, wherein the caching policy is based on the detected file system type. The detection of the file system type can be based on the received data. The detection bases can include a size of the received data. In some implementations, the detection of the file system type can be based on accessing the memory for file system type indicators that are associated with a unique file system type. Adapting the caching policy can reduce a number of data transmissions to the memory. The detected file system type can be a file allocation table (FAT) system type.

20 Claims, 8 Drawing Sheets

U.S. PATENT DOCUMENTS

| | | |
|---|---|---|
| 7,162,569 B2 | 1/2007 | Conley et al. |
| 7,237,046 B2 | 6/2007 | Paley et al. |
| 7,237,074 B2 | 6/2007 | Guterman et al. |
| 7,240,219 B2 | 7/2007 | Teicher et al. |
| 7,401,188 B2 | 7/2008 | Matthews |
| 2002/0049886 A1* | 4/2002 | Furuya et al. ............. 711/114 |
| 2002/0065810 A1 | 5/2002 | Bradley |
| 2002/0194440 A1* | 12/2002 | Ghosh et al. ............. 711/156 |
| 2003/0088591 A1 | 5/2003 | Fish |
| 2004/0117441 A1 | 6/2004 | Liu et al. |
| 2004/0138868 A1 | 7/2004 | Kuznetsov et al. |
| 2005/0005197 A1 | 1/2005 | Chong et al. |
| 2005/0091287 A1 | 4/2005 | Sedlar |
| 2005/0172082 A1 | 8/2005 | Liu et al. |
| 2005/0204099 A1* | 9/2005 | Morrow ..................... 711/143 |
| 2005/0216671 A1 | 9/2005 | Rothman et al. |
| 2005/0223165 A1 | 10/2005 | Schmidt et al. |
| 2005/0251672 A1 | 11/2005 | Kim |
| 2006/0129933 A1 | 6/2006 | Land et al. |
| 2006/0136765 A1 | 6/2006 | Poisner et al. |
| 2006/0174067 A1 | 8/2006 | Soules et al. |
| 2006/0259949 A1 | 11/2006 | Schaefer et al. |
| 2007/0174550 A1 | 7/2007 | Maeda et al. |
| 2007/0237016 A1* | 10/2007 | Miyamoto et al. ........... 365/222 |
| 2008/0133463 A1 | 6/2008 | Rothman et al. |
| 2008/0209115 A1 | 8/2008 | Maeda et al. |
| 2009/0031076 A1 | 1/2009 | In et al. |

* cited by examiner

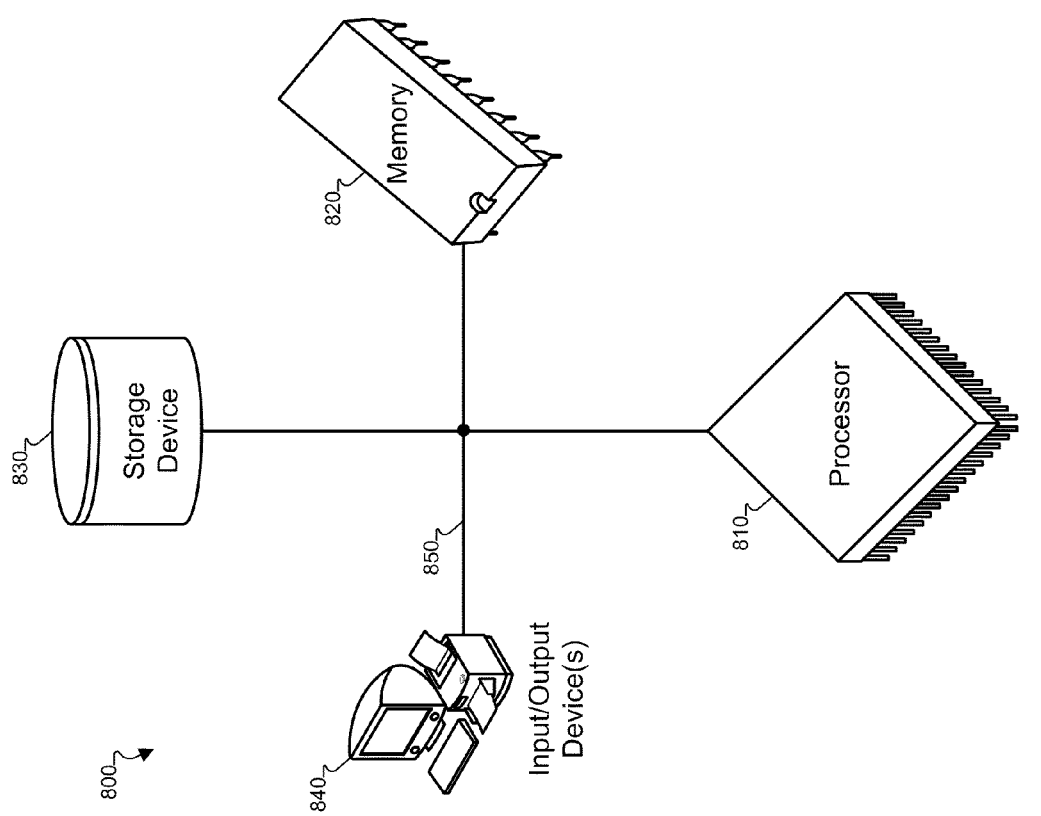

CACHING PERFORMANCE OPTIMIZATION

CROSS-REFERENCE TO RELATED APPLICATIONS

This application is a continuation application of and claims priority to U.S. application Ser. No. 11/335,968, filed on Jan. 20, 2006. The above noted application is hereby incorporated by reference in its entirety.

TECHNICAL FIELD

This application relates to a variable caching policy system and method.

BACKGROUND

As technology enables people to listen to music using MP3 players, carry digital pictures on portable hard drives, and save large word processing files on USB (Universal Serial Bus) pen drives, consumers want these portable devices to transfer the data quickly and reliably. Some current storage devices that use memory have relatively long read and write times for data stored in the memory. For example, a storage device with NAND Flash memory may have to read and write a large portion of the flash memory to make a small modification to the data. More specifically, the flash memory may be composed of blocks that contain pages which can be individually read, but may not be individually written. A device may have to access the entire block of data, modify a small portion of data in one of the pages, and then write the entire block back to the flash memory. This may result in longer reading and writing times than if the device just read and wrote the data to be modified. Additionally, the repeated writing of blocks to flash memory may cause the memory hardware at that block address to fail because of wear.

Other current storage devices are designed for use with computers that implement different file system types. These devices may be designed with a static caching method that is only optimized for one file system type, or include a less optimal caching policy designed to accommodate multiple file types. For some users, however, the static caching method may not be optimized for the users' file system type.

SUMMARY

The present application relates to a system and method for modifying a caching policy for received data.

In one general aspect, a method for managing data storage is described. It includes receiving data from an external host at a peripheral storage device, detecting a file system type of the external host, and adapting a caching policy for transmitting the data to a memory accessible by the storage device, wherein the caching policy is based on the detected file system type. The detection of the file system type can be based on the received data. The detection bases can include a size of the received data.

In some implementations, the detection of the file system type can be based on accessing the memory for file system type indicators that are associated with a unique file system type. Adapting the caching policy can reduce a number of data transmissions to the memory. The detected file system type can be a file allocation table (FAT) system type. The FAT system type can be detected if the received data is equal to or less than a received data threshold. The method can further include accessing in the memory a FAT structure of the FAT system type adapted to specify a memory location of files or directories, storing the structure in a cache, and performing operations on the structure in the cache when the operations are addressed to the structure in the memory. The adapted caching policy can include instructing a cache to store the received data until a flush cache signal is received, which initiates a transmission of at least a portion of the data to the memory. The flush cache signal can be transmitted when a cache threshold is reached.

In other implementations, the detected file system type can be a Hierarchical File System (HFS) type. The file system type HFS type can be detected if the received data is greater than a received data threshold. The adapted caching policy can instruct a cache to operate as a segmented circular array adapted to write the data to segments of the array until a last segment is written and then to rewrite the segments with additional received data. The adapted caching policy can further instruct the cache to transmit the data from a segment before the segment is rewritten. Additionally, the detected file system type can be a new technology file system (NTFS) type or a Linux file system type.

In a second general aspect, an article of manufacture is described. The article includes machine-readable instructions operable to cause a data processing apparatus to receive information that conforms to a file system type from an external computing device, determine the file system type, and modify a caching policy based on the file system type, wherein the caching policy is related to caching at least a portion of the information for transfer to a memory.

In some implementations, determining the file system type includes selecting a default file system type unless another file system type is determined. The default file system type can be a file allocation table (FAT) type. Another file system type can replace the FAT system type if the received information exceeds a received information threshold. The received information threshold can be 64 kilobytes. The article can further include receiving an indication of a connection with the external computing device and initiating the determination of the file system type in response to the indication. The article can include resetting the caching policy to a default caching policy when the connection with the external computing device is terminated.

In another general aspect, a system for managing data is described. The system includes an interface for receiving information from an external host, a cache for storing the information, and a cache manager for determining a file system type associated with the information and for modifying a caching policy based on the file system type. The caching policy is related to storage of the information in the cache and transfer of the information from the cache to a memory. The system can further include a battery operable to provide power to complete the transfer of the information from the cache to the memory after an external connection supplying power is interrupted. The memory can be a rotational memory.

In yet another general aspect, a system for managing a cache is described. The system includes means for interfacing with data from an external host, means for storing the received data, and means for detecting a file system type used by the external host and for modifying a caching policy based on the file system type. The caching policy is associated with transfers of the data to and from the means for storing. The data can be transferred from the means for storing to a flash memory. The flash memory can be a NAND flash memory.

Advantages of the systems and techniques described herein may include any or all of the following: reducing wear on the memory hardware due to repeated writing; decreasing the number of times, and thus the time required to read and write data; increasing flexibility in caching policy selection for different file system types; facilitating transfer of data after loss of external power; and enabling selection of caching policies independent of external devices.

The details of one or more embodiments are set forth in the accompanying drawings and the description below. Other features, objects, and advantages of the embodiments will be apparent from the description and drawings, and from the claims.

DESCRIPTION OF DRAWINGS

FIG. 8 is a schematic diagram of a general computer system.

DETAILED DESCRIPTION

Figure 1:
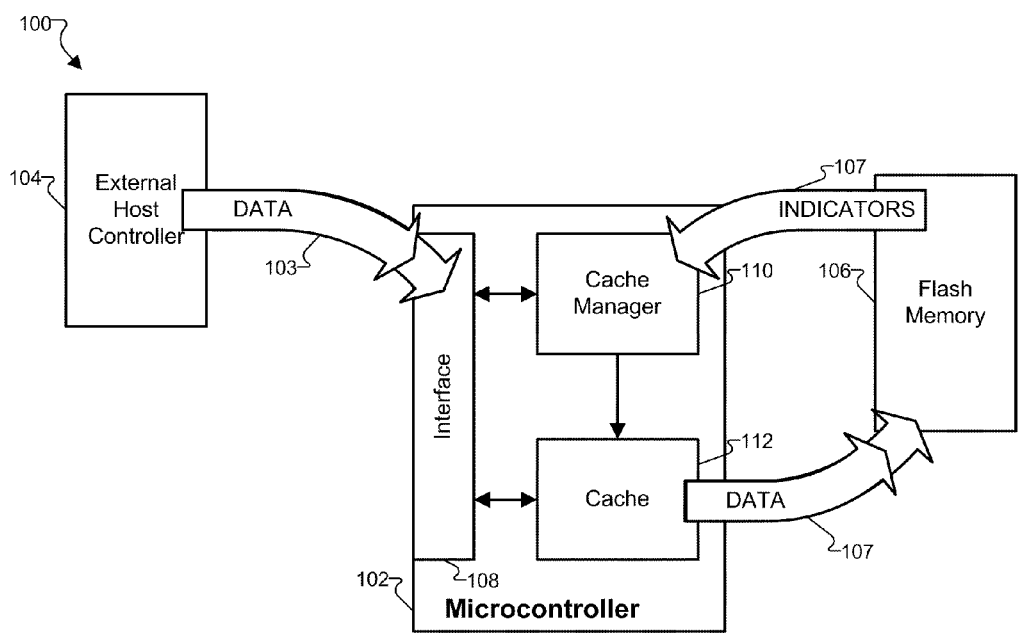
FIG. 1 is a block diagram of a system for optimizing caching performance.

FIG. 1 is a block diagram of a system 100 for optimizing caching performance. The system 100 dynamically selects a caching policy based on the detected file system type. In the implementation shown in FIG. 1, the detection may be based on received data or on file system indicators in an attached mass storage device. The ability to change the caching policy may decrease the number of times the system reads or writes to the mass storage because the selected caching policy is adapted to cache data that is most frequently written and rewritten based on the file system type.

More specifically, the system 100 shown in FIG. 1 includes a microcontroller 102, an external host controller 104, and a mass storage device, such as flash memory 106. In FIG. 1, a microcontroller 102 receives formatted data 103 from the external host controller 104, determines a file system type, and adapts a data caching policy based on the file system type.

In some implementations, the microcontroller 102 and the flash memory 106 are part of a first computing device and the external host controller 104 is part of a second computing device. For example, the first computing device may be an MP3 player connected to the second computing device, which may be a personal computer. The MP3 player may have several components, one of which is flash memory. The personal computer may transfer formatted data, such as music files, to the flash memory in the MP3 player over a communication interface to a microcontroller included in the MP3 player.

The microcontroller 102 may modify the caching policy based on the data 103 received from an external source, such as the external host controller 104. In some implementations, the microcontroller 102 detects the file system type of the data 103 by determining the size of the data operation. For example, if the received data operation is over a predetermined number of bytes, the microcontroller associates the data 103 with one file system type. If the data operation is under the predetermined number of bytes, the microcontroller associates the data 103 with a different file system type. Upon determining a data caching policy and caching the data, the microcontroller 102 then writes the cached data to the flash memory 106.

In other implementations, the microcontroller 102 may modify the caching policy based on indicators 107 present in the mass storage device 106. The indicators may result from formatting the mass storage so that it is compatible with a file system type, such as a file allocation table (FAT) system type. For example, the microcontroller 102 may query a first block of the memory 106. The reply to the query, which contains the indicators, is shown as arrow 107. If the contents of the first block match a predefined value, such as $8055_{HEX}$, then the system adopts a FAT caching policy because storage devices with FAT system types may contain $8055_{HEX}$ in the first block. Upon determining and adapting a data caching policy, the microcontroller 102 then writes the cached data to the memory 106 according to the policy.

The microcontroller 102 includes an interface 108, a cache manager 110 and a cache 112. The interface 108 enables communication between the external host controller 104 and the cache manager 110 as well as providing access to the cache 112. The cache manager 110 may contain logic to detect the file system format of data received from the interface 108. For example, if the received data is equal to or less than a specific size threshold, the cache manager 110 may determine the file system type is FAT.

Upon determination of a file system format, the cache manager 110 may store the data 103 in the cache and write to flash memory 106 based on the caching policy, which depends on the file system type. Adoption of the caching policy based on file system type may facilitate enhanced performance of the data storage system. For example, the performance time of the write operation may be improved by adopting a specific caching policy that reduces the number of transmissions necessary to write cached data to the flash memory 106.

In some implementations, the caching policy dictates when to write data to the flash memory by use of comparison operations. A comparison operation may be made between an amount of data currently stored in the cache and a cache threshold to determine whether the threshold has been met. For example, the cache manager 110 may implement a rule that the microcontroller 102 should only write data to the memory 106 when the cache 112 is full. The cache manager 110 compares the space available in the cache to a "full" threshold each time new data is entered in the cache and writes the cached data to memory 106 when the cache becomes full.

As mentioned above, in some implementations, the cache manager 110 may detect a file system in the format of a file allocation table (FAT) type. The format of attached memory can be determined by querying the mass storage device for file system type indicators 107. In addition to detecting the FAT type based on the first block of memory, the microcontroller 102 may query the boot sector on the memory 106 to determine how the memory is formatted. Additionally, metadata associated with files stored on the mass storage device may be used to determine the file system type of the attached memory, and therefore, may be used to select a corresponding caching policy to reduce the number of times that data is written to the memory.

In other implementations, the cache manager 110 may detect a file system in the format of a hierarchical file system (HFS) type by querying the mass storage device for indicators. For example, the microcontroller 102 may determine the file system type is HFS by querying the attached memory for a bitmap image, such as a boot screen, consistently located at a predefined sector in a storage device that implements the HFS system type.

In the embodiment shown in FIG. 1, modifying the caching policy to reduce accesses to the flash memory may save time and wear on the flash memory 106. Flash memory may be composed of blocks that contain pages which can be individually read, but may not be individually written. A block may contain several pages and a page can contain several bytes of data. In many flash memory write operations, the microcontroller 102 writes data to the memory using multiple steps. For example, first, the entire block of data may be read into a memory device, then the contents of the block are modified with the new data, and lastly, the entire new block is written back to the flash memory device. Modifying the caching policy to store data in the cache 112 until a specified time may reduce the number of write operations that would have occurred each time new data was received thereby saving system operating time. Reducing the number of accesses to flash memory may also save a user time because writing to flash may take longer than writing to the cache because it involves the previously specified steps of reading and writing an entire block of memory even if only a small portion of that block is modified. Additionally, queuing data in a cache and then writing to the flash memory device 106 according to a caching policy associated with the system file type saves wear on the device because the flash memory blocks are accessed fewer times.

Figure 2:
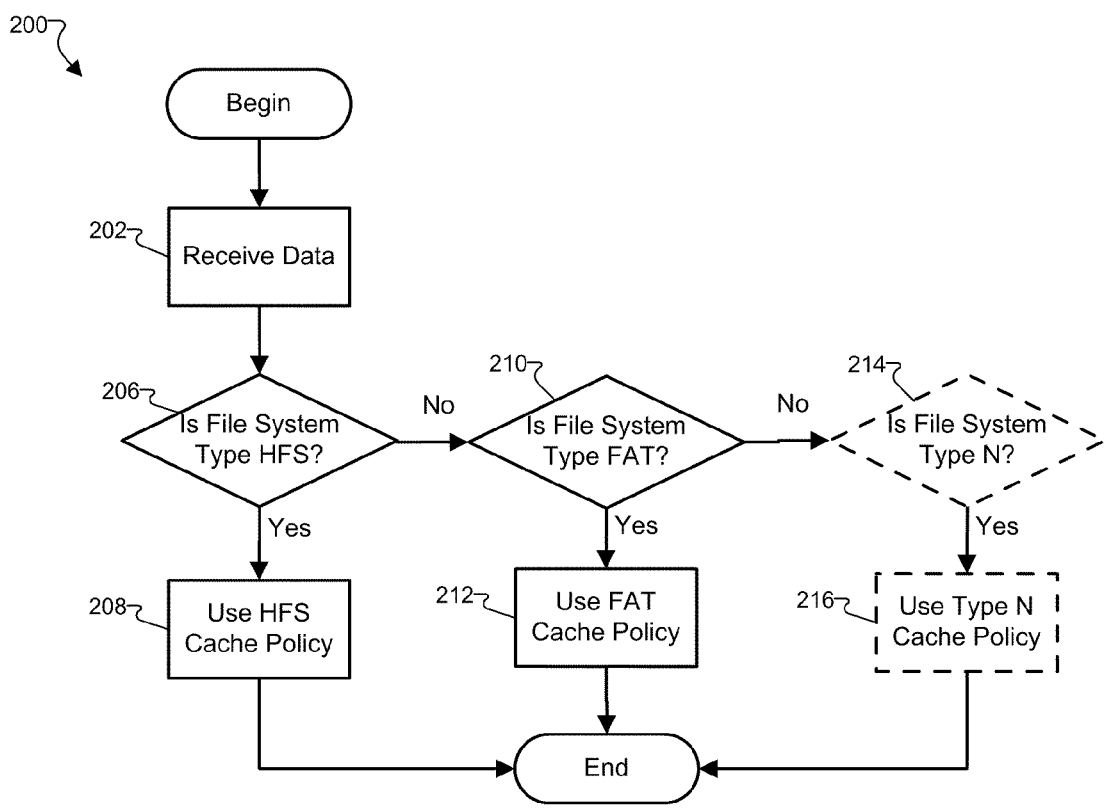
FIG. 2 is a flow chart of an exemplary method for selecting a caching policy used in the system of FIG. 1.

FIG. 2 is a flow chart of an exemplary method for selecting a caching policy used in the system of FIG. 1. The method 200 begins at step 202 when the external host sends data to the interface 108. In one embodiment, the interface 108 may be on a portable device, such as an MP3 player that includes the microcontroller 102 and the flash memory 106. The MP3 player can be connected to the external host controller, such as a personal computer, through a USB (Universal Serial Bus) connection. At step 202, the microcontroller 102 detects the USB connection between the MP3 player and the personal computer, and the detected connection transmits the data from the computer to the MP3 player, where the data is analyzed by the microcontroller 102.

At step 206, the microcontroller 102 inquires if the file system type of the received data is in HFS format. The microcontroller 102 may use the received data content or the size of the data to determine the file system type. For example, if the received write operation is over 64 kilobytes, the cache manager 110 determines that the system is sending data in HFS format because typical HFS operations exceed 64 kilobytes. Alternately, the cache controller may use metadata or specific characters within the received data, such as in header information, to determine the file system type. In some embodiments, the microcontroller may query flash memory to determine a preferred caching method based on indicators, such as boot sectors, that are unique to a particular system file type. If the cache manager 110 determines that the file system type is HFS, then the system 100 will use the HFS caching policy in step 208.

If the microcontroller 102 determines that the received data is not in HFS format, the system inquires, at step 210 if the data is in the FAT format and if so, implements the FAT caching policy for the data in step 212. Optionally, the system 100 may inquire whether other available file system formats, such as NTFS (New Technology File System) and Linux formats, match the received data at step 214 and use the corresponding caching policies at step 216. These additional file system formats may be detected in a manner similar to the detection of FAT and HFS file system types.

Figure 3:
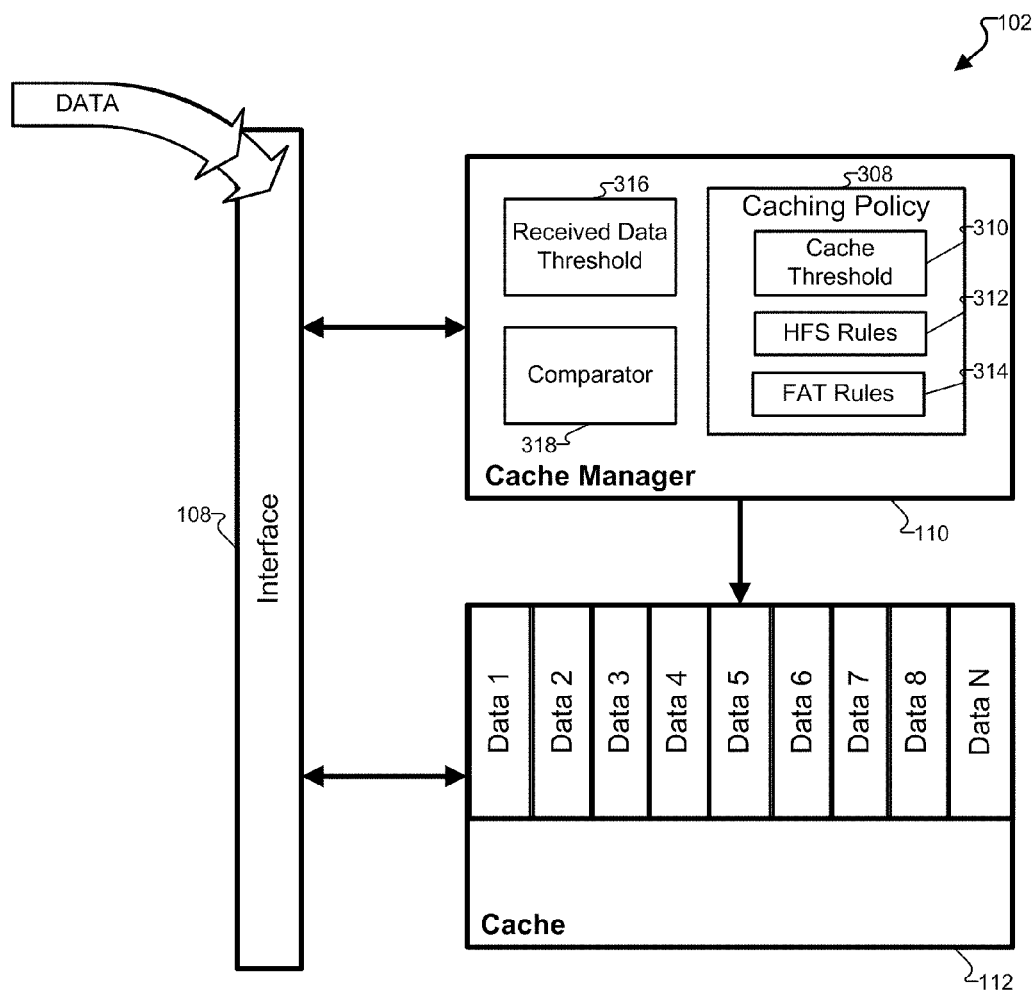
FIG. 3 is an exemplary block diagram of the microcontroller in FIG. 1 shown in more detail.

FIG. 3 is an exemplary block diagram of the microcontroller 102 of FIG. 1 shown in more detail. The microcontroller 102 may be used to translate commands received from the external host controller 104. For example, the microcontroller may receive a signal from the external host controller 104 to initiate a transfer of data over a hardware connection, such as a USB or FireWire cable. The microcontroller may enable other hardware in the system 100 to properly receive incoming data.

The microcontroller 102 includes the cache manager 110, the cache 112 and the interface 108. The cache manager 110 receives data from the interface 108 and may apply rules or other logical operations to the data such that the data is stored in the cache 112 according to a determined caching policy. The cache manager 110 may contain the caching policy 308 which, in turn, may include a cache threshold 310 used to determine when to write cache contents to memory. Additional rules may be included in the caching policy, such as HFS rules 312 and FAT rules 314, for determining how to cache and write data in each respective format. The cache 112 stores data received from the interface 108 and caches the data based on the caching policy implemented by the cache manager.

The cache threshold 310 in this example may be an address or an indicator that specifies an amount of memory, such as 85% of the cache. For example, if the microcontroller 102 writes new addresses to the cache sequentially, then when a predefined cache address is reached, the microcontroller may transfer the cache contents to the memory. Alternatively, if the microcontroller detects that a percentage of the cache is full, it may write the cached contents to memory.

When the threshold is reached, a microcontroller command, such as a flush data command, may initiate a transfer of the cache contents to the memory 106. In some implementations, the cache threshold 310 is utilized when the cache manager 110 is operating using FAT caching for the file system type. For example, in FAT caching, the system 100 may benefit by storing data in a cache until the cache threshold 310 is reached because data that would be written and rewritten numerous times to the flash memory is now modified directly in the cache. Storing this frequently written data in the cache prevents unnecessary rewrites of an entire flash memory block when only a portion of the block is modified. For example, a FAT file system contains a file allocation table structure that is entirely rewritten each time a new file is added. Storing frequently written blocks of the file allocation table structure in the cache 112 until it is full, or otherwise ready to flush the data contents, decreases the number of write operations necessary to the flash memory.

In the example shown in FIG. 3, the microcontroller also includes a comparator 318 to determine if incoming data is greater than or less than a received data threshold 316. For example, if the received data threshold is 64 kilobytes, then the cache manager 110 determines the file system type is FAT if the received data is below the received data threshold 318.

Figure 4:
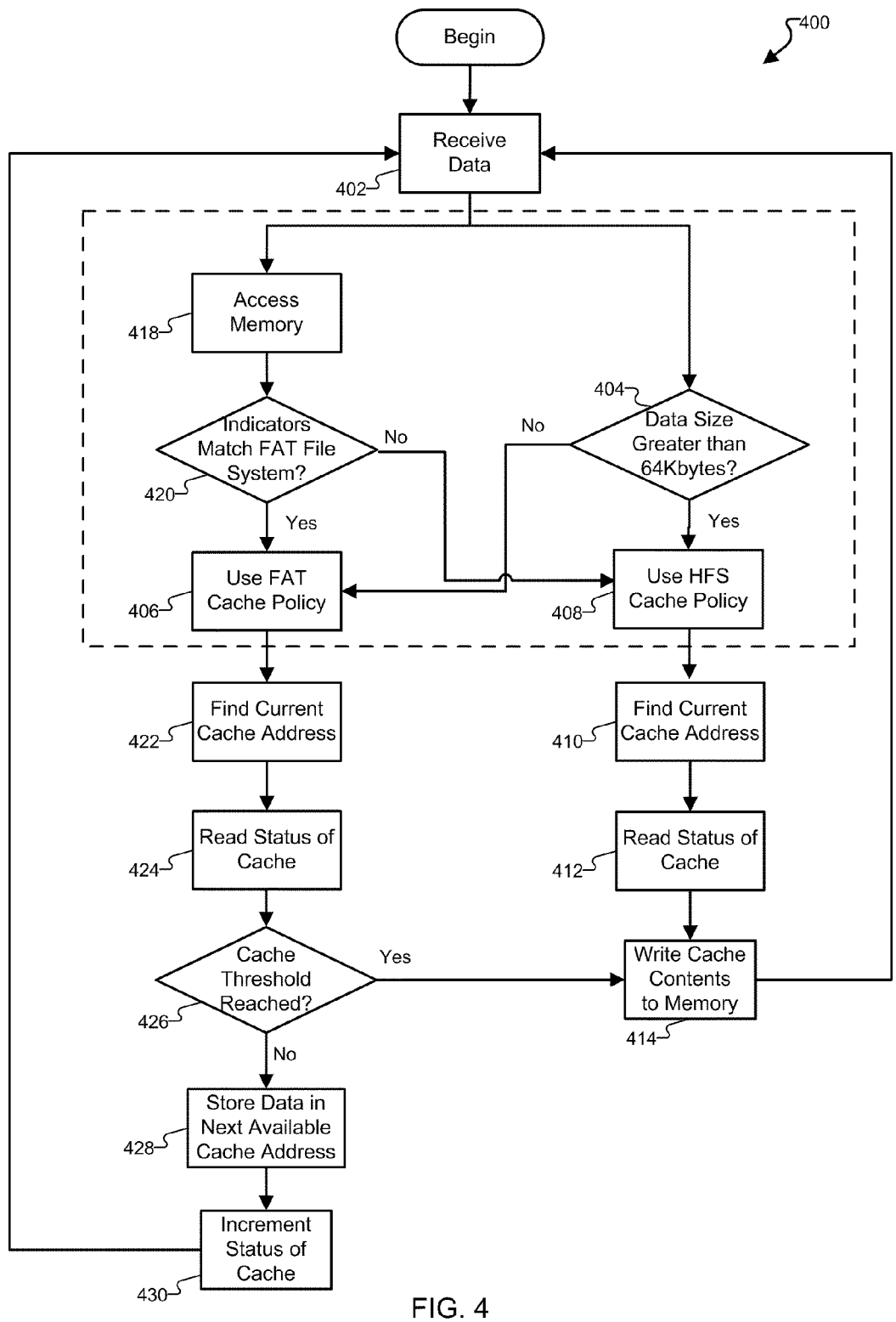
FIG. 4 is a flow chart of an exemplary method for selecting between a FAT (File Allocation Table) and HFS (Hierarchy File System) caching policy.

FIG. 4 is a flow chart of an exemplary method 400 for selecting between a FAT and HFS caching policy. In some implementations, the method 400 is used in the system shown in FIG. 3. The method 400 begins at step 402 when the external host 104, for example, sends data to the interface 108 in FIG. 1. At step 402, data is received from the external host controller 104 into the microcontroller device 102. The example shown in FIG. 4 describes two optional methods to detect the file system type, as indicated by the dashed box around the alternate methods. In one method, the microcontroller 102 may analyze the size of the received data, which may be used to indicate which caching policy to adopt, as indicated by step 404. Alternately, the microcontroller 102 may query the flash memory device for file storage indicators to determine which caching policy to use, as indicated by steps 418 and 420.

If the system 100 uses the received data to select the caching policy, then, in step 404, the microcontroller 102 may inquire if the received data size is greater than 64 kilobytes. If the received data size is less than 64 kilobytes, then the microcontroller 102 implements a FAT caching policy for incoming data in step 406. If the received data size is greater than 64 kilobytes, then the HFS caching policy is implemented in step 408.

The microcontroller may execute the steps 410 and 422 of method 400 to determine where the next available cache address is so that data can be stored there when it becomes available. For example, the microcontroller may contain a register that tracks the next cache address. After the microcontroller writes to the memory cell identified by that address, the value in the register may be incremented so that the resulting new cache address identifies the next memory cell for writing.

Additionally, the microcontroller may read a status of the cache, which may include, for example, details about what has or has not been written to memory or possible errors in the system such as interrupted power or corrupted data. In some implementations, the cache status is used to determine when overwrites may occur in the cache. For example, a bit associated with the cache may be set to indicate that the microcontroller has written data to the cache address since the address was last written to the memory. The cache manager may read this bit and determine that the cached data associated with the bit can not be overwritten until it is transferred to the memory 106.

Monitoring the status of the cached data may facilitate caching policies designed to ensure that cached data is written to memory before it overwritten by new received data. For example, in the HFS policy, it may be important to monitor the status of the cache because, in some instances, data may be cached and then immediately scheduled for transfer to the memory. If the transfer to flash memory is slower than the time required to write all the available memory in the cache, the cache manager may use the status to generate a wait signal used by the microprocessor to pause caching additional data in order to ensure that cached data is not rewritten before it is transferred to the flash memory.

For example, in the context of method 400, upon selection of the HFS caching policy, the microprocessor 102 determines the next available cache address by accessing a register with the next cache address, as indicated by step 410. Next, the microprocessor, may read the status associated with the next cache address to ensure that it may write to that cache address, as indicated in step 412. If the cache memory specified by the cache address is available for new data, the microcontroller may write the received data to that address, as indicated in step 414. When the cache contents have been written to memory, the microcontroller 102 may return to step 402 to await additional received data.

If the microcontroller 102 uses indicators in the flash memory device 106 to select the caching policy, then, after receiving the data in step 402, the microcontroller 102 may access the flash memory 106 in step 418 to determine what file system type the memory device uses based on the indicators stored in the device. For example, the query to determine the file system type may include accessing memory locations to retrieve an indicator, such as the presence of a FAT structure, that is used to determine whether the system file type is FAT, as shown in step 420. Of course, these indicators may be used to determine other file system types as well. In another example, step 420 could determine whether the indicators match a HFS file type system by examining the first memory block for the value "ER," which indicates a HFS system.

If the microcontroller 102 determines that the indicators in the memory do not match the FAT file system format, it may use a default alternative caching policy associated with another file system format, such as the HFS caching policy. Alternatively, instead of using the HFS caching policy by default when the indicators do not match the FAT file type system, multiple steps (not shown) may be used to determine whether the indicator or indicators match additional file type systems, such as Windows NTFS (New Technology File System) and Linux file systems.

If the microcontroller 102 determines that the indicators in the memory match the FAT file type system, the caching manager directs the cache to store the incoming data according to the FAT caching policy, in step 406. Upon selecting the FAT caching policy, the system 100 determines the next available cache address, in step 422 and reads the status of the cache, in step 424.

In some implementations of the FAT caching policy, a threshold is met before the cached data is written to the flash memory 106. In step 426, the microcontroller 102 inquires if the cache threshold has been reached. To determine if the threshold has been reached, the microcontroller 102 may compare the threshold 310 to a value associated with the cache, such as the percentage of memory available in the cache, the address of the next cache address in the microprocessor's register, or whether a specified memory location in the cache has been written. If the cache threshold has not been reached, the received data is stored in the next available cache address in step 428, and the address of the cache is incremented, in step 430, to indicate where the next piece of received data can be stored. Once the data has been stored in the cache and the cache address has been updated, the microprocessor 102 may return to step 402 and await additional received data.

If the cache threshold has been reached, in step 426, the microcontroller writes the cache contents to memory in step 414. As mentioned previously, all or only a portion of data may be written to memory depending on the rules implemented by the cache manager.

Figure 5:
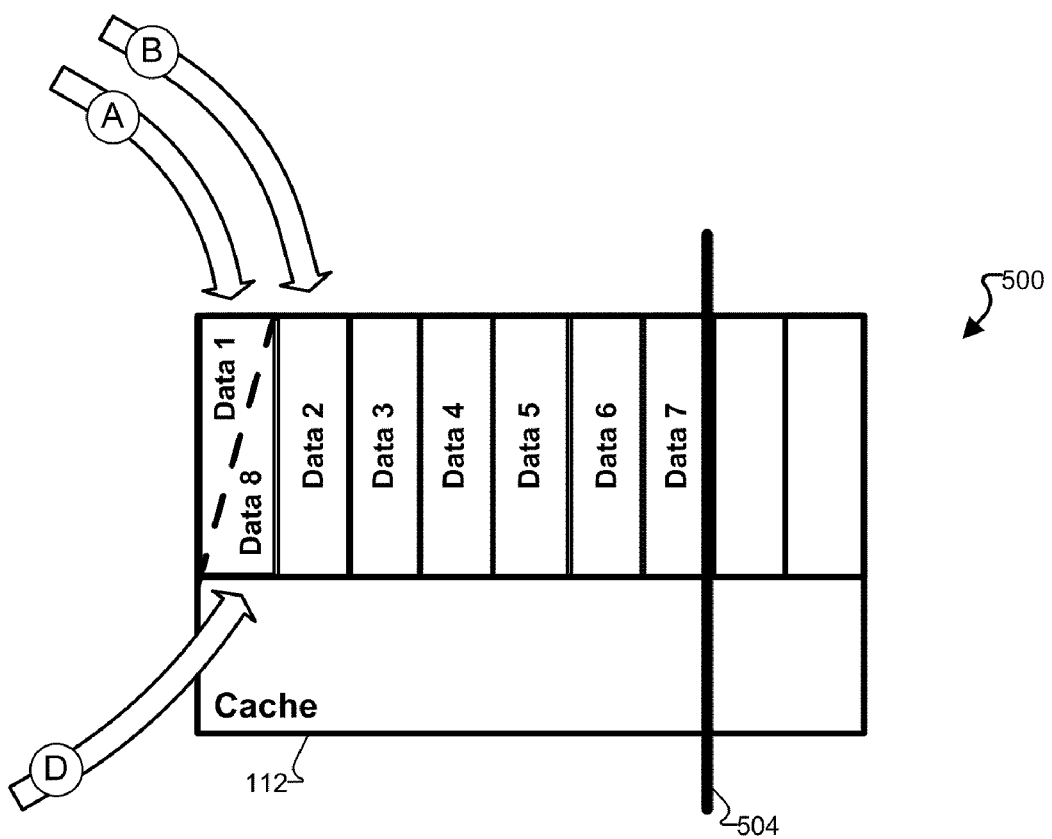
FIG. 5 is a schematic diagram of a cache implementing a file allocation table (FAT) caching policy.

FIG. 5 is a schematic diagram of the cache 112 implementing a file allocation table (FAT) caching policy. The cache 112 may be a DRAM (Dynamic Random Access Memory) that includes multiple memory cells that hold data. A FAT caching policy may store the data in the cache until it reaches a threshold or receives a system command to flush the cache or write to a mass storage device. For example, a FAT caching policy may direct the microprocessor to write data to the cache sequentially starting at a first memory cell as shown in by arrow A. The next write operation to the cache indicated by the arrow B and other write operations may follow until the threshold 504 is reached. In some implementations, the threshold is represented by a predefined memory cell such as a specific address where the cell resides. Once the predefined memory cell has been written, the threshold is met and the microcontroller may transfer the cached data to the mass storage device.

In other implementations, the threshold may be an amount of the cache that has been written. For example, an indication of a full cache may be represented by 85% of the total capacity. Memory cells may have a flag that indicates they have been written and the cache manager 110 may calculate the currently written memory cells and compare this amount to the threshold. Once the threshold is reached, some or all of the contents of the cache may be written to the mass storage device at a specified time. Meeting the threshold may trigger the cache manager to issue a flush command, which directs the microcontroller 102 to write the data from the cache to the memory. Upon writing contents to memory, new data may overwrite previously received data as shown by an arrow D in FIG. 5.

In some implementations, the cache manager 110 utilizes the FAT caching policy until the received data exceeds the received data threshold allowed for FAT caching. If the data threshold is exceeded, another file system type caching policy may replace the FAT caching policy. For example, the cache manager selects the FAT caching policy if the initially received data is less than 64 kilobytes. Subsequently received data, however, may be larger than 64 kilobytes, which indicates another file system type, such as HFS, should be selected. This situation may occur because HFS operations may range in size from under 64 kilobytes to approximately 1 megabyte, while FAT operations are limited in size to 64 kilobytes. If the microcontroller 102 receives commands that are 64 kilobytes or under, the cache manager 110 may select the FAT caching policy even though the command may be an HFS operation. When the cache manager 110 detects the received data is greater than 64 kilobytes, it may select the HFS caching policy to increase the system performance.

The FAT caching policy may be selected as the default file system type if most of the external hosts transmit data in the FAT file type format. If another file type system is used more frequently, the cache manager may be configured to default to the corresponding caching policy. In some implementations, the microcontroller selects the default caching policy after the connection between the external controller host and the microcontroller is interrupted. For example, the microprocessor may start caching the received data using the FAT caching policy, but later detect that the appropriate policy is the HFS caching policy. The microprocessor may then use the HFS caching policy for the remainder of the session, until the connection with host controller is interrupted, such as by unplugging a USB cable from a computer which includes the controller. When another connection is established, the microprocessor may again use the default caching policy to cache the data regardless of the last caching policy used.

Alternatively, the microcontroller may transfer to the mass storage an indicator specifying the last caching policy used. This indicator may be accessed when a connection is established to determine and select the last caching policy used. Furthermore, the indicator may be used to select the caching policy instead of querying the memory for file system type indicators and instead of analyzing the received data for attributes associated with a file system type.

Figure 6:
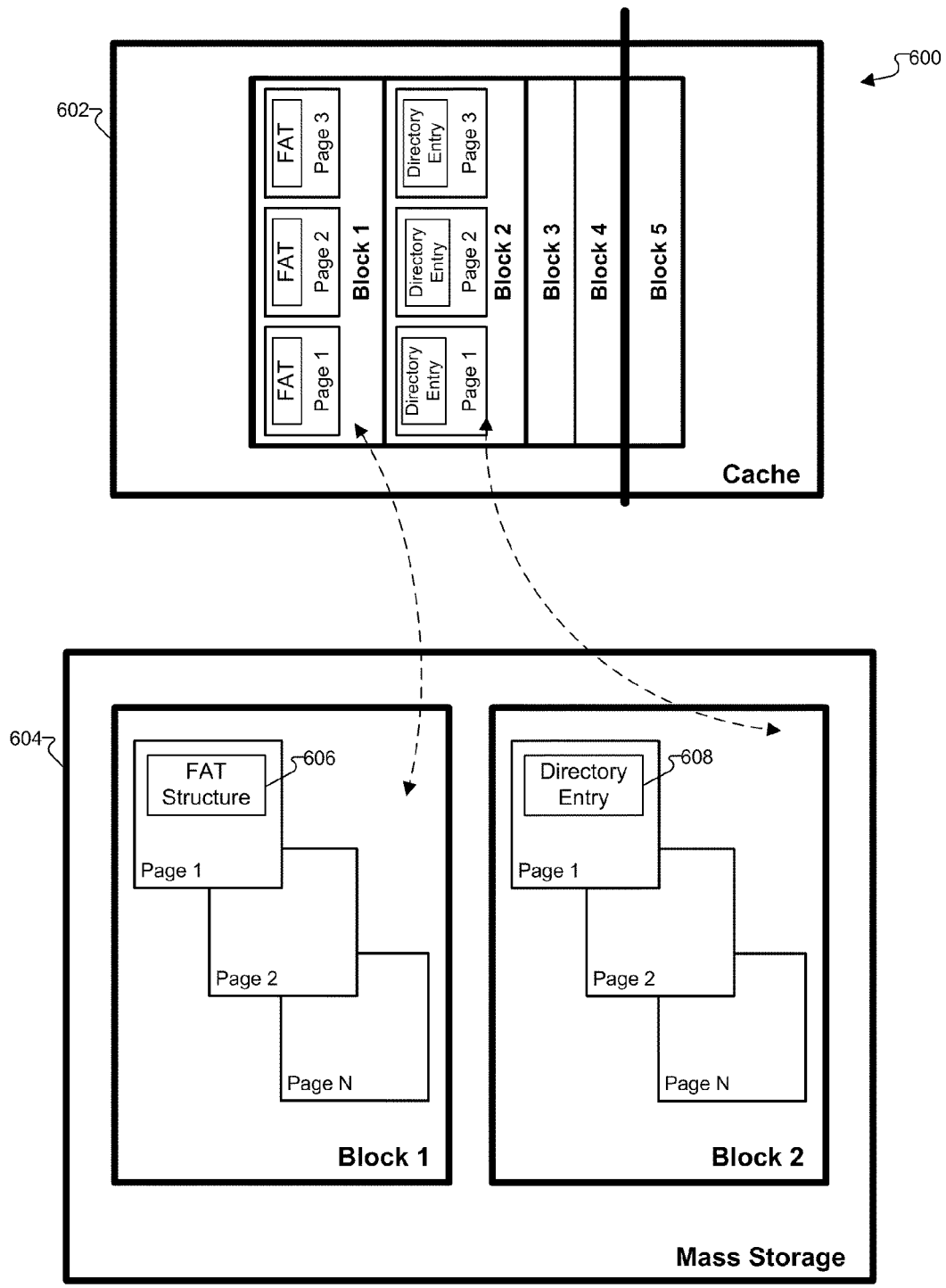
FIG. 6 is an exemplary schematic diagram of a cache that has a structure that is aligned with the underlying memory for which the cache holds data.

FIG. 6 is an exemplary schematic diagram of a cache that has a structure that is aligned with the underlying memory for which the cache holds data. In mass storage 604, such as the flash memory 106, the memory may be divided into memory blocks. Although various combinations of blocks and pages can be used in this implementation, FIG. 6 shows only a few blocks with three pages per block for simplicity. Blocks can be various sizes and contain multiple pages of one particular size depending on the memory device selected. In some mass storage system, individual pages cannot be modified without modifying a larger portion of the memory. For example, for flash memory, when data in one page requires modification, the entire block may be read into memory, modifications made to one or more pages and the whole block may then be rewritten.

Pages in a mass storage device 604 may contain file structure data 606 or directory entries 608, which serve as signatures, or indicators identifying a specific file system type. The microcontroller 102 may detect these indicators upon startup or when a connection is established with an external host controller, such as controller 104.

The file structure data 606 may be a FAT structure, which keeps a record of where files are stored on the mass storage 604. The FAT file system structure can be modified when new data is added to the mass storage 604. Directory entries 608 may also be modified each time a new directory is created or when files are added to an existing directory. The location of each of the entries 608 can be stored in a directory tree, which is located in the memory 106. The microcontroller can located the storage location of the directory tree based on the size of the memory 106. For example, a one Gigabyte memory may store the directory tree at a different address than an 8 Gigabyte memory. In some implementations, after locating the directory tree, the microcontroller can snoop the nodes in the tree to locate the directory entries, and then pre-fetch the entries for storage in the cache 112.

The cache 602 in this example emulates the underlying structure of the mass storage device 604, such as NAND flash memory, so that the number of writes to cache is reduced. For example, the cache 602 may include 64 megabytes of memory broken up into block sizes that emulate that blocks sizes used in NAND flash memory. Each page or data within each page may be modified in the cache without rewriting the entire block containing the page, which would be required if the microcontroller wrote to the underlying flash memory. Later, after the microprocessor does not need access to the frequently written data, such as the FAT structure 606 and the directory entry 608, the data can be written to the NAND flash memory. For example, the microprocessor may not need to modify the FAT structure if the connection to the external host controller 104 is disconnected, such as when an MP3 player is disconnected from a personal computer.

In some implementations, the microcontroller may transfer the cached data to the memory 106 using a battery to power the device during the data transfer. For example, if the connection is USB-based, the USB connection may provide power as well as data to the microprocessor. If a user removes the USB cable from the device, the device may lose power. An internal battery, however, may provide the power to maintain the data in the cache and power so that the microprocessor may move the cached data from the cache to memory.

Figure 7:
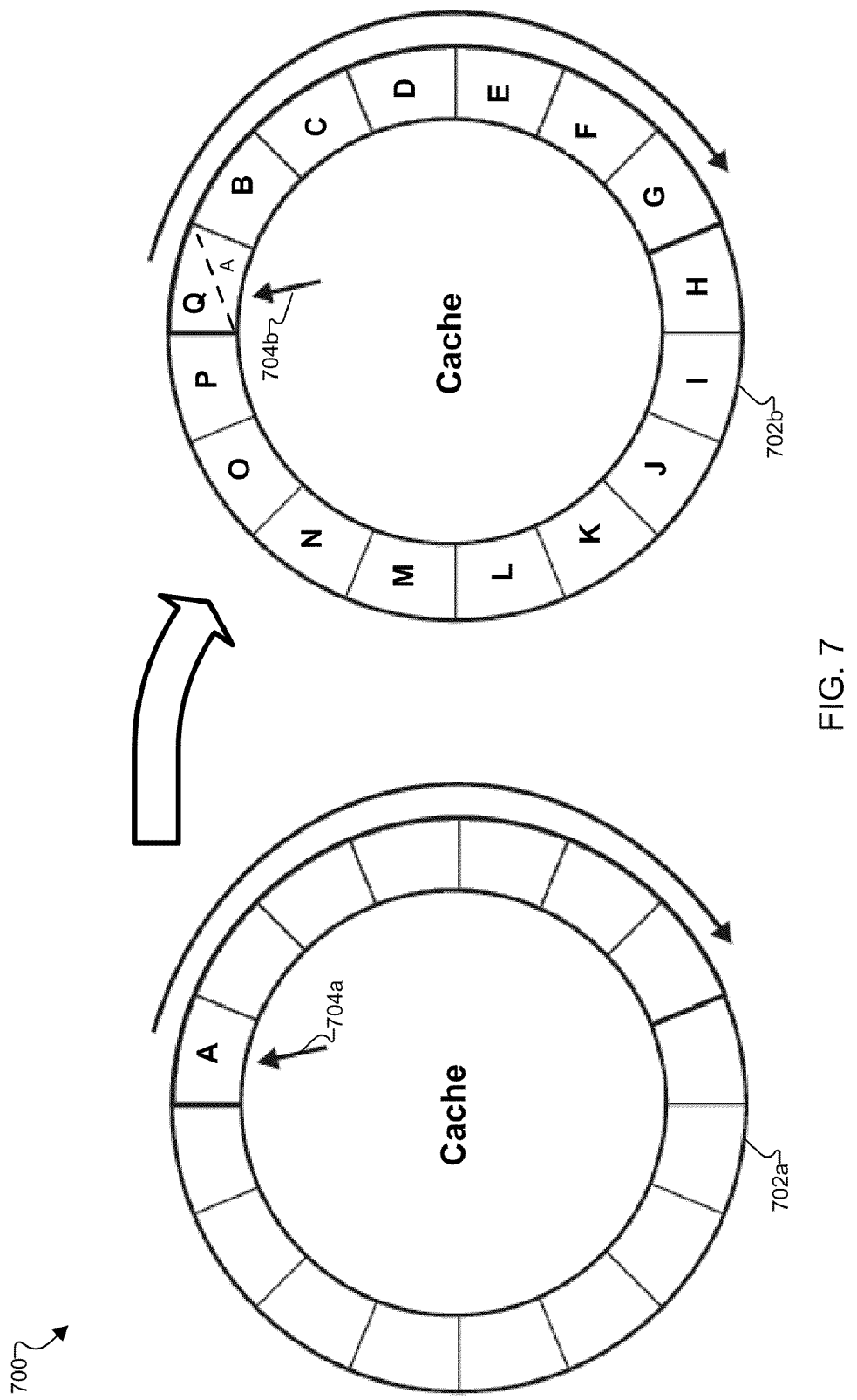
FIG. 7 is a schematic diagram of a cache implementing a hierarchical file system (HFS) caching policy.

FIG. 7 is a schematic diagram of a cache implementing a hierarchical file system (HFS) caching policy. If the cache manager 110 determines the file system type is HFS, an HFS caching policy may be implemented using a segmented circular array method where the received data is stored to cache segments in the array in a continuous fashion.

As the data is written the in cache, a signal may be generated to transfer the newly cached data to the flash memory. For example, the cache 702a includes a cache address 704a where data can be stored as it enters the cache. The cache address 704a is incremented sequentially each time data is stored in the cache. The cache 702b shows an updated cache address 704b. The updated cache address 704b identifies a cache memory location for the microcontroller to overwrite the previously written "A" information with the new "Q" information. In this example, the microcontroller 102, however, does not overwrite the cache memory location unless the previously cached "A" information has been written to the flash memory. This determination may be accomplished in a manner similar to the one described above.

In read operations, the HFS caching policy can act in a manner similar to the policy described in association with FIG. 6. For example, if the microcontroller 102 detects a connection with the external host controller, it can pre-fetch a HFS file directory and store the directory in the cache. The pre-fetch of the directory can facilitate improved performance when reading data from the memory 106 because the microcontroller can access the directory in less time when it is stored in the cache. After accessing the directory, the microcontroller can located the data specified by the directory and transmit it from the memory 106 to the external host controller 104.

FIG. 8 is a schematic diagram of a generic computer system 800. The system 800 can be used in the methods 200, 400, which are described above, according to some implementations. For example, the system 800 may be implemented in both the external host controller 104 and the microcontroller 102 and memory 106 combination.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. For example, the processor 810 can be the microcontroller 102 that executes instructions that carry out the methods 200, 400. In some implementations, the processor 810 is a single-threaded processor. In other implementations, the processor 810 is a multi-threaded processor. The processor 810 is capable of processing instructions stored in the memory 820, such as the cache 112, or on the storage device 830, such as the flash memory 106. In some implementations, the processed instructions may generate graphical information for a user interface, on the input/output device 840, which could be a screen for a MP3 player that includes the microcontroller 102 and the memory 106.

The memory 820 stores information within the system 800. In some implementations, the memory 820 is a computer-readable medium. In some implementations, the memory 820 is a volatile memory unit. In other implementations, the memory 820 is a non-volatile memory unit.

The storage device 830, such as the memory 106, is capable of providing mass storage for the system 100. In some implementations, the storage device 830 is a computer-readable medium. In various different implementations, the storage device 830 may be a floppy disk device, a hard disk device, an optical disk device, or a tape device.

The input/output device 840 provides input/output operations for the system 800. In some implementations, the input/output device 840 includes a keyboard and/or pointing device. In other implementations, the input/output device 840 includes a display unit for displaying graphical user interfaces. In yet other implementations, the input/output device 840 includes the interface 108 that transmits data between the microcontroller 102 and the external host controller 104.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The components of the system can be connected by any form or medium of digital data communication such as a communication network. Examples of communication networks include, e.g., a LAN, a WAN, and the computers and networks forming the Internet.

A number of embodiments have been described. Nevertheless, it will be understood that various modifications may be made without departing from the spirit and scope of the described embodiments. For example, the communications between the external host controller and the microcontroller are not limited to wired communications, but may include wireless connections, such as Bluetooth and IEEE 802.11g. In some implementations, the transmission of the data 103 uses iSCSI (Internet Small Computer System Interface) protocol, where the microcontroller 102 is an iSCSI target for the external host controller 104.

The microcontroller may determine the caching policy from indicators in the received data, such as the size of the data, or from an attached mass storage device as described above. In some implementations, the microcontroller 102 and mass storage 106 are part of a portable hard drive. A user may connect the hard drive to an external host controller, which may be included in a personal computer, and transfer data files from a storage device in the computer to the portable hard drive. The cache manager may select a caching policy that is associated with a file type detected from the received data in a manner similar to the one described above.

In some implementations of the FAT caching policy, data, such as the FAT structure 606, can be pre-fetched from the memory 106 and placed in the cache 112. The microcontroller 102 can determine the location of the FAT structure within the memory 106 based on the size of the memory. For example, if the memory is 2 Gigabytes, the FAT structure may be stored at a different address than if the memory is 512 Megabytes.

In other implementations, the FAT structure 606 may be fetched when the microcontroller detects a connection with the external host controller 104. For example, if the microcontroller 102 is included in a portable device, such as an MP3 player, the FAT structure 606 can be fetched from the flash memory 106 when the MP3 player is connected to a personal computer that includes the external host controller 104.

In yet other implementations, the structure can be fetched when it is first accessed by the microcontroller. For example, the microcontroller may receive data 103 from the external host controller 104. The data may impact the structure stored in the flash memory 106. In response to the received data, the microcontroller can fetch the structure from the memory and store it in the cache 112. The microcontroller can make future modifications to the structure stored in the cache. When the cache is flushed, the modified structure can be stored in the memory 106.

The mass storage may be a hard drive instead of flash memory. Alternatively, the mass storage 106 may also include other storage devices, such as CD-RW's (Rewritable CD-ROMs), DVD-RW's (Rewritable DVD's), and tapes used in tape drives. Accordingly, other embodiments are within the scope of the following claims.

What is claimed is:

1. A method for managing data, the method comprising:
receiving at a peripheral storage device an indication to prepare to perform memory operations on non-volatile memory of the peripheral storage device, wherein the received indication corresponds to the peripheral storage device being communicatively connected to an external host system;
in response to receiving the indication and before receiving a command to perform the memory operations, identifying data stored in the non-volatile memory of the peripheral storage device that is likely to be frequently accessed while performing the memory operations;
caching the identified data in a cache of the peripheral storage device;
while performing the memory operations, modifying at least a portion of the identified data in the cache without rewriting the modified portion of the identified data in the cache to the non-volatile memory; and
writing at least the modified portion of the identified data from the cache to the non-volatile memory after performing the memory operations.

2. The method of claim 1, wherein the identified data that is likely to be frequently accessed includes file structure data for a file system used to store files in the non-volatile memory.

3. The method of claim 2, wherein the file structure data includes a file access table (FAT).

4. The method of claim 1, wherein the identified data that is likely to be frequently accessed includes directory entries for a file system used to store files in the non-volatile memory.

5. The method of claim 1, wherein the non-volatile memory includes flash memory.

6. The method of claim 1, wherein the modified portion of the identified data is written from the cache to the non-volatile memory in response to the peripheral storage device being disconnected from the external host system.

7. The method of claim 1, wherein the modified portion of the identified data is written from the cache to the non-volatile memory in response to a power source for the peripheral storage device changing from a power source external to the peripheral storage device to a portable power source local to the peripheral storage device.

8. The method of claim 1, wherein the modified portion of the identified data is written from the cache to the non-volatile memory in response to a power source for the peripheral storage device changing from a portable power source local to the peripheral storage device to a power source external to the peripheral storage device.

9. The method of claim 1, wherein writing at least the modified portion of the identified data from the cache to the non-volatile memory causes a corresponding portion of data stored in the memory to be updated to reflect modifications made to the identified data while performing the memory operations.

10. The method of claim 1, wherein the non-volatile memory of the peripheral storage device includes units of non-volatile memory, each of which includes multiple sub-units of non-volatile memory;
wherein the peripheral storage device is configured to write data to the non-volatile memory in units of non-volatile memory;
wherein the portion of the identified data modified in the cache comprises a sub-unit of non-volatile memory; and
wherein writing at least the modified portion of the identified data from the cache to the non-volatile memory includes writing a unit of non-volatile memory that includes the modified portion of the identified data from the cache to the non-volatile memory.

11. The method of claim 10, wherein modifying at least the portion of the identified data in the cache includes performing multiple write operations to one or more storage locations in the cache that are associated with the identified data.

12. The method of claim 10, wherein the units of non-volatile memory include blocks of non-volatile memory and the sub-units of non-volatile memory include pages of non-volatile memory.

13. An article of manufacture comprising machine-readable instructions operable to cause a data processing apparatus to:
receive an indication to prepare to perform memory operations on non-volatile memory of the article of manufacture, wherein the received indication corresponds to the article of manufacture being communicatively connected to an external host system;
in response to receiving the indication and before receiving a command to perform the memory operations, identifying data stored in the non-volatile memory that is likely to be frequently accessed while performing the memory operations;
caching the identified data in a cache of the article of manufacture;
while performing the memory operations, modifying at least a portion of the identified data in the cache without rewriting the modified portion of the identified data in the cache to the non-volatile memory; and
writing at least the modified portion of the identified data from the cache to the non-volatile memory after performing the memory operations.

14. The article of manufacture of claim 13, wherein the identified data that is likely to be frequently accessed includes file structure data for a file system used to store files in the non-volatile memory.

15. The article of manufacture of claim 13, wherein the identified data that is likely to be frequently accessed includes directory entries for a file system used to store files in the non-volatile memory.

16. The article of manufacture of claim 13, wherein the modified portion of the identified data is written from the cache to the non-volatile memory in response to the article of manufacture being disconnected from the external host system.

17. A system for managing data comprising:
non-volatile memory configured to store data and to provide access to stored data;
an interface configured to receive an indication to prepare to perform memory operations on the non-volatile memory, wherein the received indication corresponds to the system being communicatively connected to an external host system;
a cache configured to cache data for use during the memory operations; and
a controller configured to:
in response to the indication and before receiving a command to perform the memory operations, to prepare to perform the memory operations, identify data stored in the non-volatile memory that is likely to be frequently accessed while performing the memory operations;
cache the identified data in the cache;
while performing the memory operations, modify at least a portion of the identified data in the cache without rewriting the modified portion of the identified data in the cache to the non-volatile memory; and
writing at least the modified portion of the identified data from the cache to the non-volatile memory after performing the memory operations.

18. The system of claim 17, wherein the identified data that is likely to be frequently accessed includes file structure data for a file system used to store files in the non-volatile memory.

19. The system of claim 17, wherein the identified data that is likely to be frequently accessed includes directory entries for a file system used to store files in the non-volatile memory.

20. The method of claim 1, wherein the data that is likely to be frequently accessed is identified based on a file type associated with the data or a location in the non-volatile memory at which the data is stored.

* * * * *